US011955301B2

(12) United States Patent
Werner et al.

(10) Patent No.: US 11,955,301 B2
(45) Date of Patent: Apr. 9, 2024

(54) SWITCHING DEVICE

(71) Applicant: TDK Electronics AG, Munich (DE)

(72) Inventors: Frank Werner, Berlin (DE); Torsten Klinger, Radebeul (DE)

(73) Assignee: TDK Electronics AG, Munich (DE)

(*) Notice: Subject to any disclaimer, the term of this patent is extended or adjusted under 35 U.S.C. 154(b) by 92 days.

(21) Appl. No.: 17/271,480

(22) PCT Filed: Aug. 16, 2019

(86) PCT No.: PCT/EP2019/072041
§ 371 (c)(1),
(2) Date: Feb. 25, 2021

(87) PCT Pub. No.: WO2020/043516
PCT Pub. Date: Mar. 5, 2020

(65) Prior Publication Data

US 2021/0287864 A1 Sep. 16, 2021

(30) Foreign Application Priority Data

Aug. 28, 2018 (DE) ........................ 102018120987.8

(51) Int. Cl.

| | |
|---|---|
| ***H01H 50/02*** | (2006.01) |
| ***H01H 1/20*** | (2006.01) |
| ***H01H 36/00*** | (2006.01) |
| ***H01H 50/36*** | (2006.01) |
| ***H01H 50/60*** | (2006.01) |

(52) U.S. Cl.
CPC ............ *H01H 50/023* (2013.01); *H01H 1/20* (2013.01); *H01H 36/0006* (2013.01); *H01H 50/36* (2013.01); *H01H 50/60* (2013.01); *H01H 2050/025* (2013.01)

(58) Field of Classification Search
CPC .... H01H 50/023; H01H 1/20; H01H 36/0006; H01H 50/36; H01H 50/60; H01H 2050/025; H01H 36/0026; H01H 51/28
See application file for complete search history.

(56) References Cited

U.S. PATENT DOCUMENTS 4,825,181 A * 4/1989 Nagano .............. H01H 36/0026 340/623
5,811,896 A * 9/1998 Grad .................. H01H 36/0026 324/419
8,289,026 B2 * 10/2012 Keil ....................... H03K 17/97 324/415
9,117,611 B2 * 8/2015 Naka .................... H01H 50/546
(Continued)

FOREIGN PATENT DOCUMENTS

CH 708237 A2 12/2014
CN 204011293 U 12/2014
(Continued)

*Primary Examiner* — Bernard Rojas
(74) *Attorney, Agent, or Firm* — Slater Matsil, LLP

(57) ABSTRACT

In an embodiment a switching device includes at least one stationary contact, a movable contact, an armature, a first permanent magnet, a second permanent magnet and a magnetic switch, wherein the movable contact is movable by the armature, wherein the first permanent magnet is attached to the armature, and wherein the second permanent magnet is arranged in a fixed position relative to the magnetic switch.

18 Claims, 4 Drawing Sheets

(56) References Cited

U.S. PATENT DOCUMENTS

| | | | | |
|---|---|---|---|---|
| 10,115,512 | B2 * | 10/2018 | Koch | G01S 17/06 |
| 10,854,406 | B2 | 12/2020 | Bobert | |
| 2004/0212468 | A1 * | 10/2004 | Ross, Jr. | H01H 36/0026 335/205 |
| 2009/0322453 | A1 * | 12/2009 | Kawaguchi | H01H 50/20 335/81 |
| 2013/0335174 | A1 | 12/2013 | Kodama et al. | |
| 2014/0002092 | A1 * | 1/2014 | Kodama | H01H 71/04 324/418 |
| 2019/0019643 | A1 * | 1/2019 | Bobert | H01H 71/04 |

FOREIGN PATENT DOCUMENTS

| | | | |
|---|---|---|---|
| DE | 143670 | A1 | 9/1980 |
| DE | 102007002176 | A1 | 7/2008 |
| DE | 102007028940 | A1 | 1/2009 |
| GB | 1254066 | A | 11/1971 |
| WO | 2017129823 | A1 | 8/2017 |

* cited by examiner

SWITCHING DEVICE

This patent application is a national phase filing under section 371 of PCT/EP2019/072041, filed Aug. 16, 2019, which claims the priority of German patent application 102018120987.8, filed Aug. 28, 2018, each of which is incorporated herein by reference in its entirety.

TECHNICAL FIELD

A switching device is specified.

BACKGROUND

The switching device is embodied in particular as a remotely operated, electromagnetically acting switch which can be operated by electrically conductive current. The switching device can be activated via a control current circuit and can switch a load current circuit. In particular, the switching device can be embodied as a relay or as a contactor, in particular as a power contactor. Particularly preferably, the switching device can be embodied as a gas-filled power contactor.

One possible application of switching devices of this type, in particular of power contactors, is opening and disconnecting battery circuits, for example in motor vehicles such as electrically or partially electrically powered motor vehicles, for example. They can be purely battery-powered vehicles (BEV: "Battery Electric Vehicle"), hybrid electric vehicles which can be charged via an outlet or charging station (PHEV: "Plug-in Hybrid Electric Vehicle") and hybrid electric vehicles (HEV: "Hybrid Electric Vehicle"), for example. In this case, both the positive contact and the negative contact of the battery are usually disconnected by means of a power contactor. This disconnection takes place during normal operation, for example when the vehicle is idle as well as in the event of a disturbance, such as an accident or the like, for example. In this case, the main function of the power contactor is to switch the vehicle in a voltage-free manner and to interrupt the current flow.

A particularly serious fault which can occur in a switch of this type is a so called "stuck". In this case, switching elements "stick" together as a result of welding during a switching-off or switching-on, so that a safe disconnection of the load circuit cannot be guaranteed even if the supply voltage of the switch has been switched off. An identification of the switch position is therefore useful when using power contactors in circuits with life-threatening voltages for reasons of safety, so that in the case of a stuck contactor, it is possible to respond to this erroneous function with appropriate measures.

One possibility for identifying the switching position is to use parallel contacts, i.e. auxiliary contacts, for the main contact. However, if the main contacts of the contactor are in a hermetically sealed gas-filled space, the realization of such measures is very complex, since in the case of auxiliary contacts, their lines must also be led to the outside in a leak-tight manner. Another possibility in the case of gas-filled housings which are not hermetically sealed is to use a separate switch element, in particular a microswitch, which is also actuated via a mechanical coupling to the main switch contact by way of its switching movement. However, like every mechanical switch, a microswitch of this type is subject to the usual signs of wear.

SUMMARY OF THE INVENTION

Embodiments provide an improved switching device. According to one embodiment, a switching device has at least one stationary contact and at least one movable contact. The at least one stationary contact and the at least one movable contact are provided and set up to switch on and switch off a load circuit which can be connected to the switching device. The movable contact can be moved in the switching device correspondingly between a non-switched-through state, also referred to hereinafter as a non-active or switched off state, and a switched-through state of the switching device, also referred to hereinafter as an active or switched on state, in such a way that the movable contact is spaced apart and therefore galvanically isolated from at least one stationary contact in the non-switched-through state of the switching device and has a mechanical contact to the at least one stationary contact in the switched-through state and is therefore galvanically connected to the at least one stationary contact. The fact that the switching device has at least one stationary contact can particularly preferably also mean that the switching device has at least two stationary contacts which are arranged disconnected from one another in the switching device and which can be connected to one another in an electrically conductive manner or electrically disconnected from one another by way of the movable contact in the manner described depending on the state of the movable contact.

Description parts which are related to at least one stationary contact equally also apply to a plurality of and in particular all stationary contacts which are present in the switching device.

The at least one stationary contact and/or the movable contact can be made with or of Cu, a Cu alloy, one or a plurality of refractory metals such as, for example, W, Ni and/or Cr, or a combination of said materials, for example of copper with at least one further metal, for example W, Ni and/or Cr.

According to a further embodiment, the switching device has a housing in which the movable contact and the at least one stationary contact are arranged. In particular, the movable contact can be completely arranged in the housing. The fact that a stationary contact is arranged in the housing can in particular mean that the contact region of the stationary contact, which is in mechanical contact with the movable contact in the switched-through state, is arranged inside the housing. In order to connect a supply line of an electric circuit which is to be switched by the switching device, a stationary contact which is arranged in the housing can be electrically contactable from the outside, i.e. from outside the housing. For this purpose, a stationary contact which is arranged in the housing can protrude out of the housing with one part and have a connection possibility for a supply line outside the housing.

According to a further embodiment, the switching device has a switching chamber in which the movable contact and the at least one stationary contact are arranged. In particular, the switching chamber can be arranged in the housing. The movable contact can particularly preferably be completely arranged in the switching chamber. The fact that a stationary contact is arranged in the switching chamber can in particular mean that at least one contact region of the stationary contact, which is in mechanical contact with the movable contact in the switched-through state, is arranged inside the switching chamber. In order to connect a supply line of an electric circuit which is to be switched by the switching device, a stationary contact which is arranged in the switching chamber can be electrically contactable from the outside, i.e. from outside the switching chamber. For this purpose, a stationary contact which is arranged in the switching chamber can protrude out of the switching chamber with one part and have a connection possibility for a supply line outside the switching chamber.

According to a further embodiment, the movable contact can be moved by means of an armature. For this purpose, the armature can have an shaft which is connected to the movable contact at one end in such a way that the movable contact can be moved by means of the shaft, i.e. if there is a movement of the shaft, it is also moved by this. The shaft can in particular protrude into the switching chamber through an opening in the switching chamber. In particular, the switching chamber can have a switching chamber floor which has an opening through which the shaft protrudes. The armature can be movable through a magnetic circuit, in order to bring about the switching processes described previously. For this purpose, the magnetic circuit can have a yoke which has an opening through which the shaft of the armature protrudes. Moreover, the armature can have a magnetic core which can be attached to an end of the shaft, which is opposite the movable contact, and which is part of the magnetic circuit. By way of a coil, which can be connected to a control circuit, a magnetic field can be generated in the magnetic circuit through which the armature is moved.

The shaft can preferably include or be made of stainless steel. The yoke and/or the magnetic core can preferably include or be made of pure iron or a low doped iron alloy. The switching chamber, i.e. in particular the switching chamber wall and/or the switching chamber floor, can at least partially preferably include or be made of a metal oxide ceramic such as $Al_2O_3$ or a plastics material, for example. Plastics materials which have a sufficient temperature stability are particularly suitable. For example, the switching chamber can include polyetheretherketone (PEEK), a polyethylene (PE) and/or glass-filled polybutylene terephthalate (PBT) as a plastics material. Moreover, the switching chamber can at least partially also include a polyoxymethylene (POM), in particular with the structure $(CH_2O)_n$.

According to a further embodiment, the contacts are arranged in a gaseous atmosphere. In particular, this can mean that the movable contact is completely arranged in the gaseous atmosphere and that moreover at least one part of the at least one stationary contact, for example the contact region of the at least one stationary contact, is arranged in the gaseous atmosphere. For this purpose, the switching device can have a gas-tight region in which the gaseous atmosphere is kept hermetically sealed from the environment and in which the described components can be arranged. The gas-tight region can be formed by parts of the housing and/or by additional walls and/or by components inside the housing. For example, the gas-tight region can be formed by parts of the switching chamber wall and the yoke in combination with additional wall parts, for example made with or of aluminum or stainless steel. In particular, the switching chamber can be arranged in the gas-tight region of the switching device. Moreover, the armature can also be completely arranged inside the gas-tight region. The switching device can correspondingly particularly preferably be a gas-filled switching device such as a gas-filled contactor, for example. The gaseous atmosphere can in particular facilitate extinguishing electric arcs which may arise between the contacts during the switching processes. The gas of the gaseous atmosphere can preferably have a proportion of at least 50% $H_2$. In addition to hydrogen, the gas can have an inert gas, particularly preferably $N_2$ and/or one or a plurality of noble gases. Moreover, the gas, i.e. at least a part of the gaseous atmosphere, can in particular be located in the switching chamber.

According to a further embodiment, the switching device has a magnetic switch, i.e. a switch which can be switched on and off by the action of magnetic fields. The magnetic switch can in particular have a closed state and an open state, between which can be switched back and forth by the action of magnetic fields. The magnetic switch can preferably be a reed switch. The reed switch can have contact tongues, for example in a glass tube with protective gas filling or vacuum, which, depending on the acting magnetic field, are mechanically disconnected from one another, which corresponds to the open state, or touch one another, which corresponds to the closed state. Particularly preferably, the magnetic switch can be a normally-open switch, i.e. a reed switch which is in an open state in the absence of magnetic fields. A switch of this type can also be referred to as a NO switch.

According to a further embodiment, the switching device has a first permanent magnet. The first permanent magnet can in particular be attached to the armature. Together with the contacts of the switching device and the armature, the first permanent magnet can thus be arranged inside the gas-tight region. In particular, the first permanent magnet can be arranged at an end of the armature which faces away from the movable contact. For example, the first permanent magnet can be attached to the magnetic core and/or to the shaft of the armature. The first permanent magnet can be a bar magnet or a disc magnet or a ring magnet. Particularly preferably, the first permanent magnet can be a ring magnet, which is arranged symmetrically to the shaft of the armature.

By attaching the first permanent magnet to the armature, the first permanent magnet can also be movable through the switching movement of the armature when switching the switching device. The magnetic switch and the first permanent magnet can in particular be arranged relative to one another in such a way that the magnetic field generated by the first permanent magnet at the location of the magnetic switch is weaker in the switched on state of the switching device than in the switched off state of the switching device. The magnetic switch can be arranged along the movement direction of the armature, for example below the first permanent magnet, i.e. at the end of the armature to which the first permanent magnet is attached. In particular, the magnetic switch can be arranged along an imaginary extension of the shaft of the armature centered or slightly offset thereto below the armature and the first permanent magnet. In the switched on state of the switching device, the first permanent magnet can have a greater distance to the magnetic switch than in the switched off state of the switching device.

According to a further embodiment, the switching device has a second permanent magnet which is arranged in a fixed position relative to the magnetic switch. This can in particular mean that the second permanent magnet always remains arranged in an equal position relative to the magnetic switch regardless of the switching state of the switching device. For example, the second permanent magnet, together with the magnetic switch, can be attached to a part of the housing. In particular, the second permanent magnet and the magnetic switch can be arranged outside the gas-tight region. This makes it possible to contact the magnetic switch in a simple manner.

The second permanent magnet can be designed and arranged relative to the magnetic switch in such a way that the magnetic field, which is generated by the second permanent magnet, at the location of the magnetic switch is such that the magnetic switch is in a closed state in the absence of further magnetic fields. In short, the second permanent magnet can thus generate a magnetic field through which the magnetic switch is kept in a closed state in the absence of further magnetic fields. The combination of the magnetic switch and the second permanent magnet can thus form a so called NC switch (NC: "normally closed"). In particular, the second permanent magnet can be designed and arranged relative to the magnetic switch in such a way that the magnetic switch is kept in a closed state byway of the second permanent magnet in the switched on state of the switching device. The second permanent magnet is therefore arranged in such a position that the magnetic switch is closed if the switching device is in a switched on state. In particular, the magnetic switch and the second permanent magnet can be designed and arranged in such a way that the magnetic switch remains in the closed state even when operating the coil of the switching device, by means of which the armature and thus the movable contact are moved, irrespective of stray fields caused by the coil at the location of the magnetic switch. The second permanent magnet can be a bar magnet or a disc magnet or a ring magnet.

Moreover, the first permanent magnet can be designed in such a way that it generates a magnetic field which, with sufficient proximity to the magnetic switch and in particular in a switched off state of the switching device, weakens the magnetic field of the second permanent magnet. In particular, the magnetic field of the first permanent magnet can weaken the magnetic field of the second permanent magnet in a switched off state of the switching device in such a way that the magnetic switch is in the open state. In other words, the magnetic field of the second permanent magnet can be influenced and weakened when the first permanent magnet approaches the second permanent magnet and the magnetic switch, which is brought about by the switching off movement of the armature, in such a way that the magnetic switch no longer remains in the closed state, but rather changes into the open state. Correspondingly, the magnetic switch can be in an open state if the switching device is in the switched off state.

By way of the first permanent magnet, the second permanent magnet and the magnetic switch, which is preferably designed as a normally-open switch, it can be achieved in the manner described previously that the switching state of the switching device corresponds to the switching state of the magnetic switch. If the load circuit is therefore closed by the contacts of the switching device, the magnetic switch is also closed, and vice versa. This can in particular be achieved by way of a suitable arrangement of the permanent magnets and by way of a suitable size and orientation of the magnetic fields generated by the permanent magnets, which magnetic fields can in particular be dimensioned in such a way that magnetic interference fields, for example brought about by the coil of the magnetic circuit for switching the switching device as well as by external magnetic fields, have no influence on the switching activity of the magnetic switch. As described, the magnetic switch is moved permanently, i.e. at least in the absence of further magnetic fields, into the closed state by the second permanent magnet, which is attached outside the hermetically sealed region. Only if the contacts of the switching device are opened and the first permanent magnet, arranged in the gas-tight region, approaches the magnetic switch as a result of a movement of the armature is the magnetic switch switched and is then in an open state corresponding to the non-active state of the contacts of the switching device. It is therefore possible to identify the state of the contacts of the switching device, i.e.

open or closed, by the state of the magnetic switch. A stuck contactor can also be clearly identified in this way by the still closed state of the magnetic switch, since the magnetic switch would always have to have an open state in the case of the coil being disabled, i.e. the control circuit being switched off.

The switching device described here can thus make do with a simple reed switch, designed as a normally-open switch, as a magnetic switch. Without the second permanent magnet, the magnetic switch would, if designed as a normally-open switch, be moved into the closed state by the first permanent magnet if the switching device is in the switched off state, and vice versa. The magnetic switch would therefore behave inversely to the state of the switching device, which may be undesired from the user's point of view, since the magnetic switch should open and close in the same manner as the switching device. Alternatively to a normally-open switch, a reed switch which is designed as a changeover switch could then be used, which is designed as a double contact switch with a NO contact and an NC contact. However, switches of this type are more expensive and also significantly more interference-prone than simple normally-open switches. Moreover, the latter is easier to position, since simple reed switches are smaller and more robust than reed changeover switches.

BRIEF DESCRIPTION OF THE DRAWINGS

Further advantages, advantageous embodiments and developments are set forth in the exemplary embodiments which are described hereinafter in connection with the figures.

In the figures.

Figure 1A:
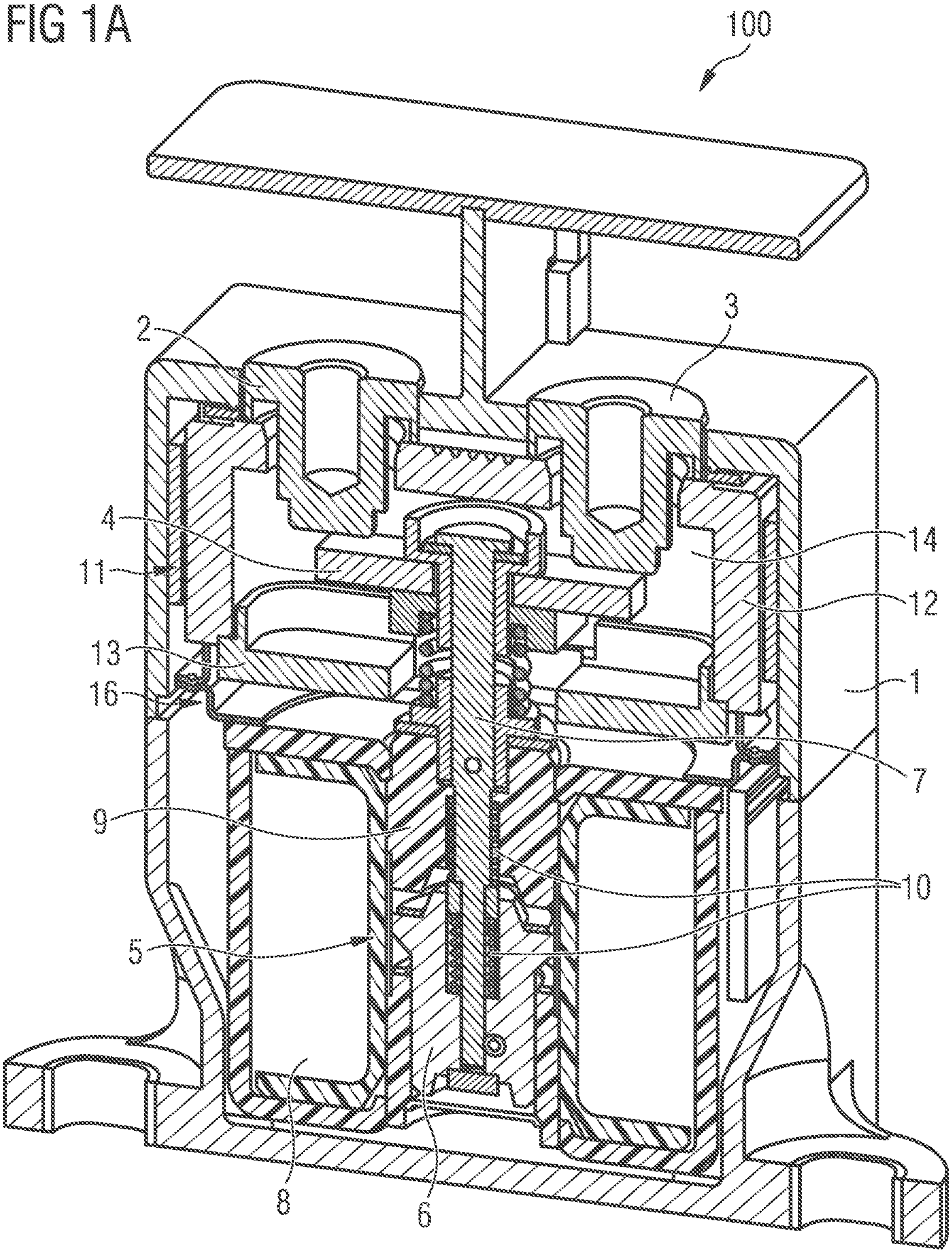
FIGS. 1A and 1B show schematic illustrations of an example for a switching device.

In the exemplary embodiments and figures, identical, similar or identically-functioning elements can be provided in each case with the same reference numerals. The illustrated elements and their size ratios with respect to one another are not to be regarded as being true to scale, on the contrary individual elements, such as for example, layers, components, structural elements and regions can be illustrated in an excessively large manner in order to improve the presentability and/or to improve the understanding of the invention.

DETAILED DESCRIPTION OF ILLUSTRATIVE EMBODIMENTS

Figure 1B:
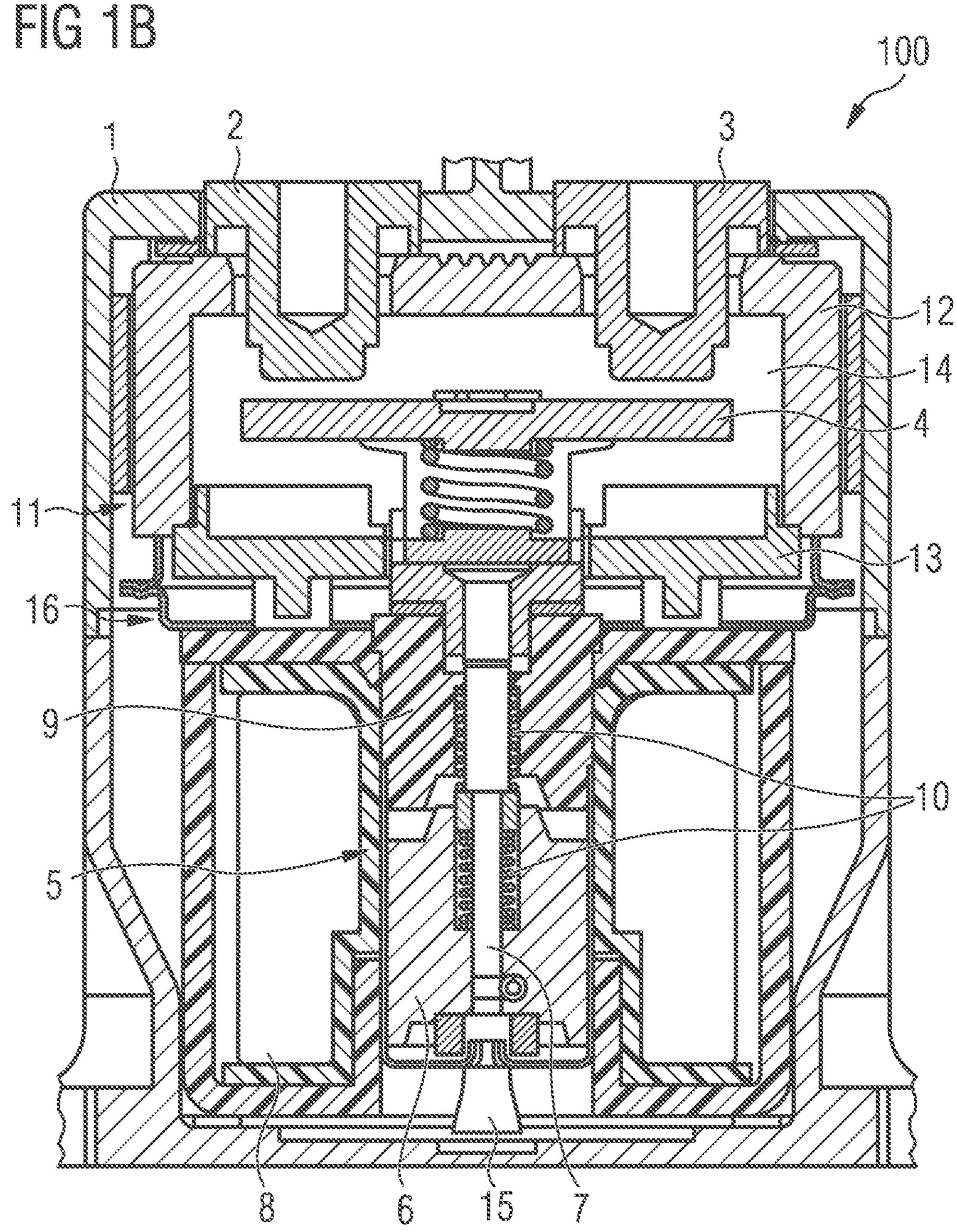

FIGS. 1A and 1B show a switching device 100 which can be used for switching strong electrical currents and/or high electrical voltages, for example, and which can be a relay or contactor, in particular a power contactor. FIG. 1A shows a three-dimensional sectional illustration, while FIG. 1B represents a two-dimensional sectional illustration. The subsequent description similarly relates to FIGS. 1A and 1B. The geometries shown are only exemplary and are not intended to be understood to be limiting and can also be designed alternatively.

The switching device 100 has two stationary contacts 2, 3 and a movable contact 4 in a housing 1. The movable contact 4 is designed as a contact plate. The stationary contacts 2, 3, together with the movable contact 4, form the switch contacts. Alternatively to the number of contacts shown, other numbers of fixed and/or movable contacts may also be possible. The housing 1 serves primarily as protection against contact for the components arranged in the interior and includes or is made of a plastics material, for example PBT or fiberglass-filled PBT. The contacts 2, 3, 4 can, for example, be made with or of Cu, a Cu alloy or a combination of copper with at least one further metal, for example W, Ni and/or Cr.

FIGS. 1A and 1B show the switching device 100 in an idle state in which the movable contact 4 is spaced apart from the stationary contacts 2, 3, so that the contacts 2, 3, 4 are galvanically isolated from one another. The embodiment shown of the switch contacts and in particular their geometry are intended to be understood to be purely exemplary and not limiting. Alternatively, the switch contacts may also be designed in a different way. For example, it may be possible that only one of the switch contacts is designed to be fixed.

The switching device 100 has a movable armature 5 which essentially carries out the switching movement. The armature 5 has a magnetic core 6, for example made with or of a ferromagnetic material. Moreover, the armature 5 has a shaft 7 which is guided through the magnetic core 6 and is fixedly connected to the magnetic core 6 at a shaft end. At the other shaft end, which is opposite the magnetic core 6, the armature 5 has the movable contact 4 which is also connected to the shaft 7. The shaft 7 can preferably be manufactured with or from stainless steel.

The magnetic core 6 is surrounded by a coil 8. A current flow in the coil 8, which current flow can be connected from the outside by way of a control circuit, generates a movement of the magnetic core 6 and thus of the entire armature 5 in the axial direction, until the movable contact 4 contacts the stationary contacts 2, 3. In the illustration shown, the armature moves upward. The armature 5 therefore moves from a first position, which corresponds to the shown idle state and at the same time the disconnected, i.e. non-switched-through and therefore switched off state, into a second position, which corresponds to the active, i.e. switched-through and thus switched on state. In the active state, the contacts 2, 3, 4 are galvanically connected to one another. If the current flow in the coil 8 is interrupted, the armature 5 is moved into the first position again by way of one or a plurality of springs 10. In the illustration shown, the armature 5 thus moves downward again. The switching device 100 is then in the idle state again, in which the contacts 2, 3, 4 are open.

When the contacts 2, 3, 4 are opened, an electric are may arise which can damage the contact surfaces. This can result in the risk of the contacts 2, 3, 4 becoming “stuck” together and no longer disconnecting from one another as a result of welding caused by the electric arc. Consequently, the switching device then continues to be in the switched on state, despite the fact that the current in the coil is switched off and therefore the load circuit should be disconnected. In order to prevent an electric arc of this type from arising or in order to at least facilitate extinguishing electric arcs which occur, the contacts 2, 3, 4 are arranged in a gaseous atmosphere, such that the switching device 100 is designed as a gas-filled relay or gas-filled contactor. For this purpose, the contacts 2, 3, 4 are arranged inside a switching chamber 11, formed by a switching chamber wall 12 and a switching chamber floor 13, in a gas-tight region 16 which is formed by a hermetically sealed part. The gas-tight region 16 completely surrounds the armature 5 and the contacts 2, 3, 4 except for parts of the stationary contacts 2, 3 which are provided for external connection. The gas-tight region 16 and thus also the switching chamber 11 are filled with a gas 14. The gas-tight region 16 is essentially formed by parts of the switching chamber 11, the yoke 9 and additional walls. The gas 14, which can be poured into the gas-tight region 16 by way of a gas filling nozzle 15 within the framework of the production of the switching device 100, can particularly preferably contain hydrogen, for example with 50% or more $H_2$ in an inert gas or even with 100% $H_2$, since gas which contains hydrogen can facilitate extinguishing electric arcs. Moreover, so called blow magnets (not shown) can be present inside or outside the switching chamber 11, i.e. permanent magnets which bring about an extension of the electric are path and thus can improve the extinguishing of the electric arc. The switching chamber wall 12 and the switching chamber floor 13 can be manufactured with or from a metal oxide, for example, such as $Al_2O_3$, for example. Moreover, plastics materials with a sufficiently high temperature stability, for example a PEEK, a PE and/or a glass-filled PBT, are also suitable. Alternatively or additionally, the switching chamber 11 can at least partially also include a POM, in particular with the structure $(CH_2O)_n$.

Figure 2A:
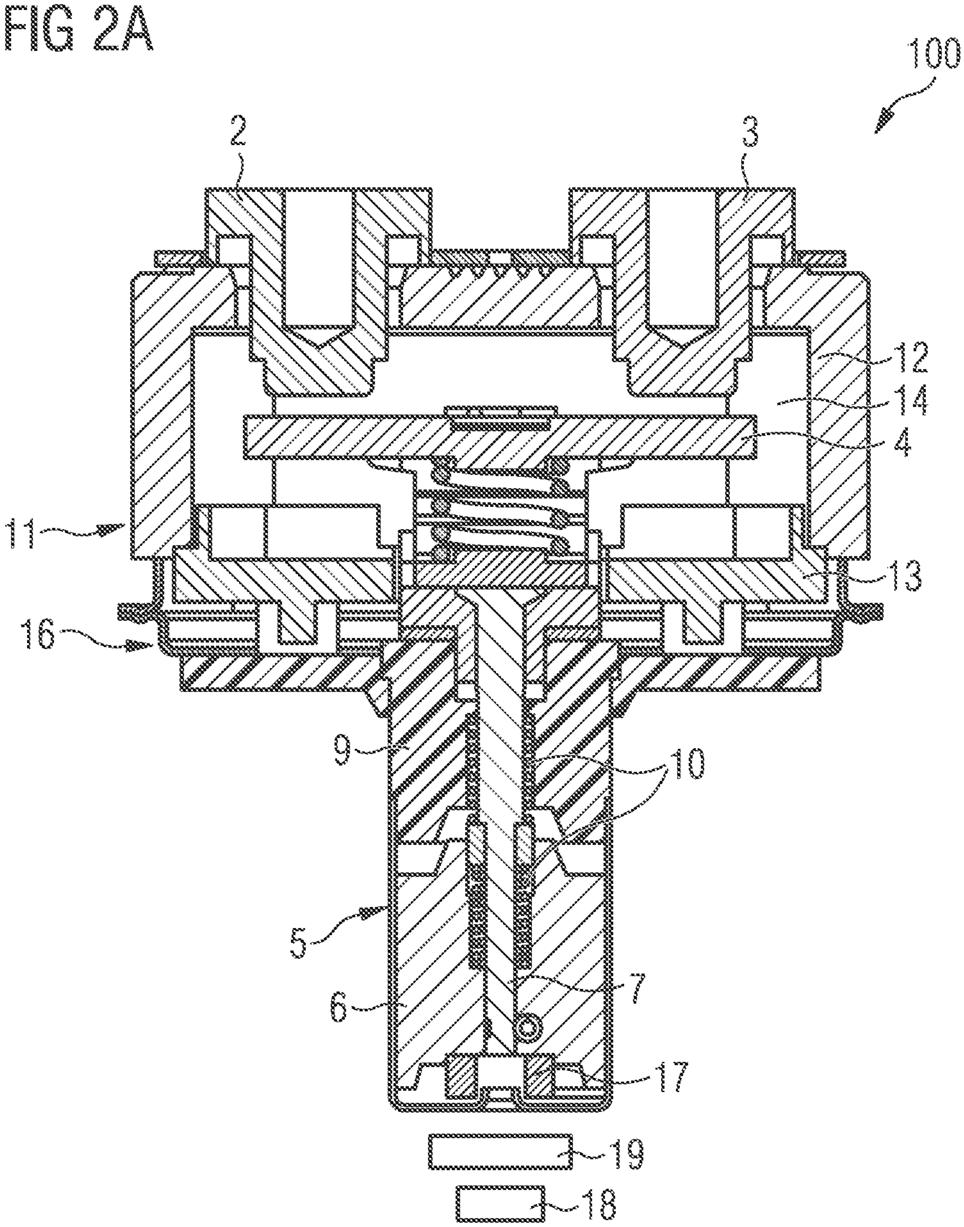
FIGS. 2A to 2C show schematic illustrations of a part of the switching device according to an exemplary embodiment.
Figure 2B:
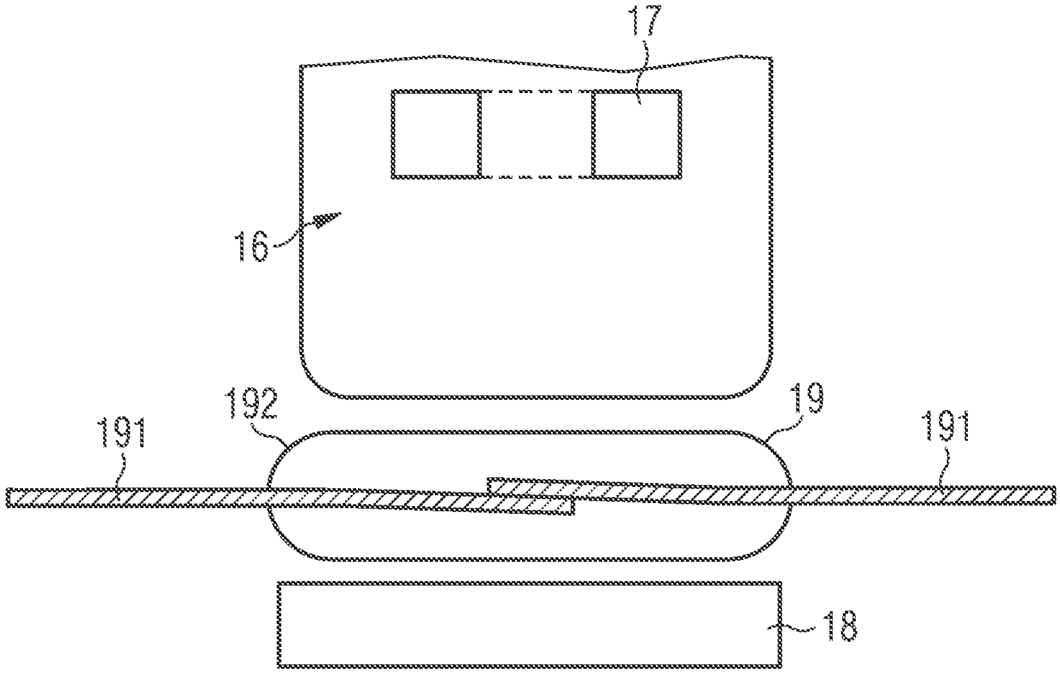
Figure 2C:
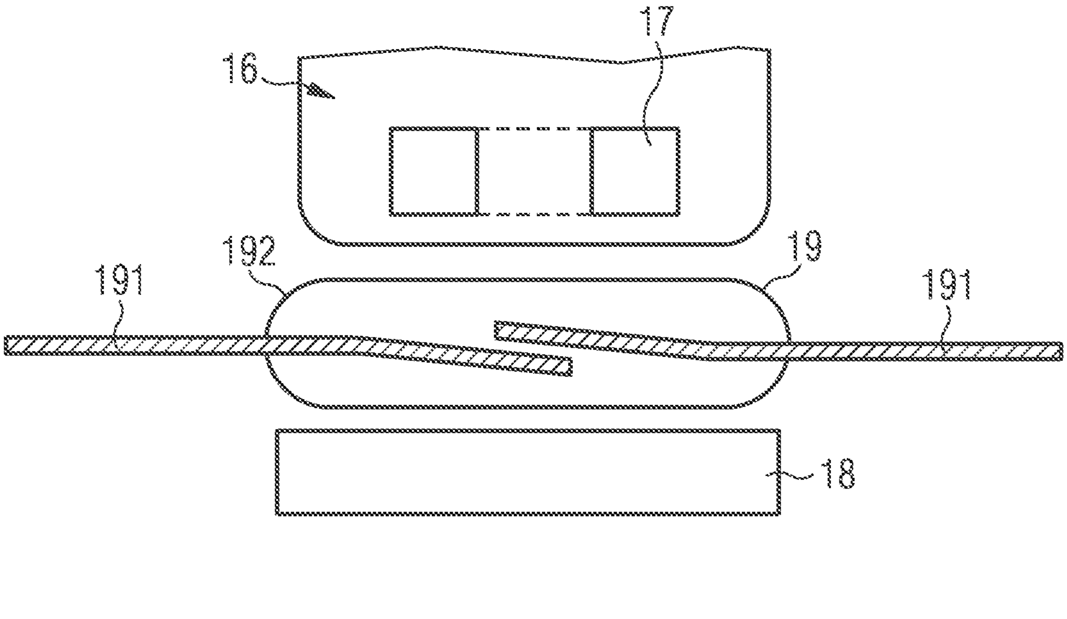

In order to obtain information regarding the actual position of the movable contact 4 and thus with respect to a possible stuck contactor, for example, the switching device 100 has further components which are not shown in FIGS. 1A and 1B for the sake of clarity and which are described in connection with FIGS. 2A to 2C. Moreover, the switching device 100 has in particular a first permanent magnet 17, a second permanent magnet 18 and a magnetic switch 19. FIG. 2A essentially only shows those components and parts of the switching device 100 from FIGS. 1A and 1B which form the gas-tight region 16 of the switching device 100. FIGS. 2B and 2C show simplified cut-outs thereof. Unless otherwise described, the components and parts shown in FIGS. 2A to 2C as well as the components and parts of the switching device 100 which are not shown in FIGS. 2A to 2C in comparison to FIGS. 1A and 1B correspond to the components and parts which are described in connection with FIGS. 1A and 1B.

The first permanent magnet 17, together with the contacts 2, 3, 4 and the armature 5, is arranged inside the gas-tight region 16 and is in particular attached to the end of the armature 5 which faces away from the movable contact 4. As a result, the first permanent magnet 17 can be moved together with the movable contact 4 by way of the armature 5.

As represented in FIG. 2A, the first permanent magnet 17 can be designed as a ring magnet and be attached to the magnetic core 6 of the armature 5. Alternatively to this, the first permanent magnet 17 can also be designed as a bar magnet or disc magnet and alternatively or additionally can also be attached to the shaft 7. Alternatively to the represented arrangement of the first permanent magnet 17, symmetrical in relation to the shaft 7, the first permanent magnet 17 can also be arranged and attached in a different position, in particular if the functionality described hereinafter, together with the second permanent magnet 18 and the magnetic switch 19, can be improved as a result.

The second permanent magnet 18, together with the magnetic switch 19, is arranged outside the gas-tight region 16 inside the housing of the switching device 100 not shown in FIGS. 2A to 2C. In particular, the second permanent magnet 18 and the magnetic switch 19 in the housing are each installed in a fixed position, so that the second permanent magnet 18 is arranged in a fixed position relative to the magnetic switch 19. The second permanent magnet 18 can be a bar magnet or alternatively also a ring magnet or disc magnet, for example. As represented in FIGS. 2A to 2C, the second permanent magnet 18 and the magnetic switch 19 can be arranged along the movement direction of the armature 5 below the first permanent magnet 17. In this case, an arrangement symmetrical to the shaft 7 may be possible, as shown. As already mentioned in relation to the first permanent magnet 17, the positions of the second permanent magnet 18 and/or the magnetic switch 19 can also deviate from the positions shown, in particular if the functionality of said components can be improved as a result.

The magnetic switch 5 is designed as a simple reed switch. A shown in FIGS. 2B and 2C, the magnetic switch can have contact tongues 191, for example in a melted shut glass tube 192 with protective gas filling or vacuum, which, depending on the acting magnetic field, are mechanically disconnected from one another, which corresponds to the open state of the magnetic switch 19, or touch one another, which corresponds to the closed state of the magnetic switch 19. In particular, the magnetic switch 5 is designed in the form of a normally-open switch and thus in an open switching state in the absence of magnetic fields.

The second permanent magnet 18 is designed and arranged relative to the magnetic switch 19 in such a way that the magnetic field, which is generated by the second permanent magnet 18 at the location of the magnetic switch 19, is so large that the magnetic switch 19 is in a closed state at least in the absence of further magnetic fields. The second permanent magnet 18 thus generates a sufficiently large magnetic field that the magnetic switch 19 is always kept in a closed state in the absence of further magnetic fields. The first permanent magnet 17 is arranged and designed in such a way that it can at least partially compensate the magnetic field of the second permanent magnet 18 if at a sufficiently short distance from the magnetic switch 19 and from the second permanent magnet 18. However, if the first permanent magnet 17 is far enough away from the magnetic switch 19 and from the second permanent magnet 18, a compensation does not occur or only such a low compensation that the magnetic switch 19 is kept in the closed state by the magnetic field of the second permanent magnet 18. This is the case in particular if the switching device 100 is in the switched on state and the armature 5, with the movable contact 4 and the first permanent magnet 17, is arranged at a maximum distance from the magnetic switch 19. This state is shown in FIG. 2B, wherein in FIG. 2B as in FIG. 2C, only the positions of the permanent magnets 17, 18 and the magnetic switch 19 are indicated, without the remaining components of the switching device. Owing to the arrangement and design of the second permanent magnet 18, the magnetic switch is therefore closed if the switching device 100 is also in the switched on state, i.e. the movable contact 4 is in mechanical contact with the stationary contacts 2, 3.

According to the previous description, the magnetic switch 19 and the first permanent magnet 17 are arranged relative to one another in such a way that the magnetic field generated by the first permanent magnet at the location of the magnetic switch is weaker in the switched on state of the switching device 100 than in the switched off state of the switching device 100. In the switched off state of the switching device 100, the first permanent magnet 17, as shown in FIG. 2C, is located so close to the magnetic switch 19 and to the second permanent magnet 18 that the magnetic field of the second permanent magnet 18 is strongly compensated in such a way that the resulting magnetic field is no longer large enough in order to keep the magnetic switch 19 in the closed state and the magnetic switch 19 is in an open state. Correspondingly, the magnetic switch 19 is in an open state if the switching device 100 is in the switched off state.

By detecting the state of the magnetic switch 19, for example by means of a resistance measurement, the state of the switching device 100 can thus be directly identified. In particular, it can be easily identified if the switching device 100 is still in the active state as a result of a stuck contactor, despite the fact that the current for the coil which moves the armature 5 is already switched off and the switching device 100 should correspondingly be in the non-active state.

The features and exemplary embodiments described in conjunction with the figures can be combined with one another according to further exemplary embodiments, even if not all combinations have been explicitly described. Furthermore, the exemplary embodiments described in conjunction with the figures may alternatively or additionally include further features in accordance with the description in the general part.

The invention is not restricted to the exemplary embodiments by the description on the basis of said exemplary embodiments. Rather, the invention encompasses any novel feature and any combination of features, which in particular includes any combination of features in the patent claims, even if this feature or this combination is not itself explicitly specified in the patent claims or exemplary embodiments.

The invention claimed is:

1. A switching device comprising:
at least one stationary contact;
a movable contact;
an armature;
a first permanent magnet;
a second permanent magnet; and
a magnetic switch,
wherein the movable contact is movable by the armature,
wherein the first permanent magnet is attached to the armature,
wherein the second permanent magnet is arranged in a fixed position relative to the magnetic switch,
wherein the armature comprises a shaft, and
wherein the first permanent magnet, the magnetic switch and the second permanent magnet are symmetrically arranged to a longitudinal length of the shaft.

2. The switching device as claimed in claim 1, wherein the magnetic switch is a reed switch.

3. The switching device as claimed in claim 1, wherein the magnetic switch is a normally-open switch.

4. The switching device as claimed in claim 1, wherein the second permanent magnet is configured to generate a magnetic field through which the magnetic switch is kept in a closed state in absence of further magnetic fields.

5. The switching device as claimed in claim 1, wherein the magnetic switch is kept in a closed state by the second permanent magnet in a switched on state of the switching device.

6. The switching device as claimed in claim 1, wherein the first permanent magnet is configured to generate a magnetic field which weakens a magnetic field of the second permanent magnet in a switched off state of the switching device.

7. The switching device as claimed in claim 1, wherein a magnetic field of the first permanent magnet weakens a magnetic field of the second permanent magnet in a switched off state of the switching device such that the magnetic switch is present in an open state.

8. The switching device as claimed in claim 1, wherein the first permanent magnet is arranged at an end of the armature facing away from the movable contact.

9. The switching device as claimed in claim 1, wherein the armature has a magnetic core, and wherein the first permanent magnet is attached to the magnetic core and/or to the shaft.

10. The switching device as claimed in claim 1, wherein the first permanent magnet is a ring magnet arranged symmetrically to the shaft of the armature.

11. The switching device as claimed in claim 1, wherein the contacts, the armature and the first permanent magnet are arranged inside a gas-tight region.

12. The switching device as claimed in claim 11, wherein the magnetic switch and the second permanent magnet are arranged outside the gas-tight region.

13. The switching device as claimed in claim 12, wherein the gas-tight region contains a gas and the gas contains $H_2$.

14. The switching device as claimed in claim 13, wherein the gas has a proportion of at least 50% $H_2$.

15. A switching device comprising:

at least one stationary contact;

a movable contact;

an armature;

a first permanent magnet;

a second permanent magnet; and a magnetic switch, wherein the movable contact is movable by the armature, wherein the first permanent magnet is attached to the armature, wherein the second permanent magnet is arranged in a fixed position relative to the magnetic switch, wherein the contacts, the armature and the first permanent magnet are arranged inside a gas-tight region, wherein the magnetic switch and the second permanent magnet are arranged outside the gas-tight region, wherein the armature comprises a shaft, and wherein the first permanent magnet, the magnetic switch and the second permanent magnet are symmetrically arranged to a longitudinal length of the shaft.

16. The switching device as claimed in claim 15, wherein the first permanent magnet is a ring magnet.

17. The switching device as claimed in claim 16, wherein the ring magnet is arranged symmetrically to the shaft of the armature.

18. A switching device comprising:

at least one stationary contact;

a movable contact;

an armature;

a first permanent magnet;

a second permanent magnet; and a magnetic switch, wherein the movable contact is movable by the armature, wherein the first permanent magnet is attached to the armature, wherein the second permanent magnet is arranged in a fixed position relative to the magnetic switch, wherein the first permanent magnet is a ring magnet arranged inside a gas-tight region, wherein the armature comprises a shaft, and wherein the first permanent magnet, the magnetic switch and the second permanent magnet are symmetrically arranged to a longitudinal length of the shaft.

* * * * *